(12) United States Patent
Leamon et al.

(10) Patent No.: US 9,258,583 B2
(45) Date of Patent: Feb. 9, 2016

(54) CONTENT RATING

(71) Applicant: Comcast Cable Communications, LLC, Philadelphia, PA (US)

(72) Inventors: Andrew Leamon, Berwyn, PA (US); Charles Durai, Balalynwyd, PA (US); Ramya Narayanaswamy, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 33 days.

(21) Appl. No.: 13/945,635

(22) Filed: Jul. 18, 2013

(65) Prior Publication Data

US 2015/0026706 A1 Jan. 22, 2015

(51) Int. Cl.
| | |
|---|---|
| *H04H 60/33* | (2008.01) |
| *H04N 21/25* | (2011.01) |
| *H04N 21/258* | (2011.01) |
| *H04N 21/466* | (2011.01) |
| *H04N 21/442* | (2011.01) |

(52) U.S. Cl.
CPC ....... *H04N 21/251* (2013.01); *H04N 21/25891* (2013.01); *H04N 21/44222* (2013.01); *H04N 21/4668* (2013.01)

(58) Field of Classification Search
USPC .................................................. 725/9, 14, 29
See application file for complete search history.

(56) References Cited

U.S. PATENT DOCUMENTS

| | | | |
|---|---|---|---|
| 2006/0288072 A1* | 12/2006 | Knapp et al. ................... | 709/203 |
| 2010/0280876 A1* | 11/2010 | Bowra ............................. | 705/10 |
| 2011/0072448 A1* | 3/2011 | Stiers et al. ..................... | 725/10 |
| 2011/0093905 A1* | 4/2011 | McKinley et al. .............. | 725/92 |
| 2013/0060648 A1* | 3/2013 | Maskatia et al. ............... | 705/22 |

* cited by examiner

*Primary Examiner* — Nnenna Ekpo
(74) *Attorney, Agent, or Firm* — Banner & Witcoff, Ltd.

(57) ABSTRACT

Disclosed are systems and methods for generating ratings for content items based on a user's consumption history. The content items may comprise various forms of media content, including, video, audio, Internet webpages, etc. When a user or consumption device accesses content items, a computing device may monitor the amount of the content items consumed by a user over one or more consumption sessions. In one embodiment, threshold values may be identified for one or more rating levels of a rating scale associated with the content items, and a rating for a content item may be generated based on the amount of the content item consumed by the user or the amount paid for the content item by the user. The computing device may calibrate or update generated ratings by measuring accuracy of the ratings and adjusting one or more threshold values associated with the content items.

19 Claims, 3 Drawing Sheets

CONTENT RATING

BACKGROUND

Content users have a large variety of content options at their disposal. A user often has hundreds of channels or services available to watch at any given time, and many additional items of content that the user can choose to watch. Sifting through this content can be difficult. Some systems collect feedback from users in an effort to identify desirable content so that recommendations can be made. Such feedback collection systems, however, are rendered less effective when users do not offer their feedback. Accordingly, there remains a need to improve content recommendation systems.

SUMMARY

The following summary is for illustrative purposes only, and is not intended to limit or constrain the detailed description. The following summary merely presents various described aspects in a simplified form as a prelude to the more detailed description provided below.

Features herein relate to a content rating system and method that may be used as a stand-alone recommendation system or comprise a portion of another recommendation system. The content rating system may be based on a user's previous viewing and/or payment history. According to one aspect of the disclosure, a user may request one or more content items from a content provider for consumption. Content items may be transmitted from a content provider's server to one or more consumption or access devices associated with a user. A content item may also be transmitted from a data processing facility, such as a local office, to the user. After a content item is transmitted and displayed (or presented) on a consumption or access device, the amount of the content item consumed by the user and other information relating to the content item may be identified by a provider's or a third-party's computing device, which may be disposed at the local office or another location.

This information may be processed by the computing device to generate a rating for the content item. The computing device may also identify a plurality of rating levels of a rating scale associated with the content item to generate ratings. One or more rating levels identified by the computing device may be associated with a plurality of threshold values. Threshold values associated with a rating level may be processed by the computing device to generate a rating for a content item based on user content consumption. Threshold values may be determined by the computing device based on information relating to a content item, including, but not limited to cost of the content, whether the user has paid for the content item, video and/or audio quality of the content, genre of the content, etc. Ratings generated by the computing device may be processed by a rating and/or recommendation system to identify additional content items for user consumption.

In another aspect of the disclosure, heuristic and/or statistical data relating to the predicative accuracy of content ratings may be calculated by the computing device. For example, ratings generated by the computing device for a content item may be compared to a rating selected by the user for the content item and/or similar content items having user ratings. The computing device may be configured to determine an accuracy threshold based on collected predicative accuracy data. Accuracy thresholds may be used to determine whether a modification to one or more threshold values associated with a content item is required. In yet another aspect of the disclosure, the computing device may be configured to identify a distribution of content ratings for one or more content items. The computing device may be configured to adjust threshold values associated with one or more content items based on the distribution of content ratings.

The summary here is not an exhaustive listing of the novel features described herein, and are not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Various features described herein relate to determining a user's recommendation for a piece of content based on how much of the content the user consumes. For example, a user who purchases a video on demand movie, but only watches half of it, might not have enjoyed the movie much at all. The system herein may track the user's consumption, noting that the user only watched half of the movie, and may determine a content rating for the user. The system may determine that a user who watched 75% of a movie enjoyed the movie more than a user who only watched 25% of the movie. The system may also take cost into account, and may determine that a user who watched only 25% of a pay-per-view movie, and 25% of a free on demand movie, likely enjoyed the free movie more, on the assumption that the incentive to finish watching the movie is greater with the pay-per-view movie because it cost money to buy. The system may set consumption and cost (and other) thresholds, such as watching 25% of a free movie to yield a one-star rating on a five-star ratings scale, and may adjust those thresholds over time to improve its predictive accuracy. These and other features will be described in greater detail further below.

Figure 1:
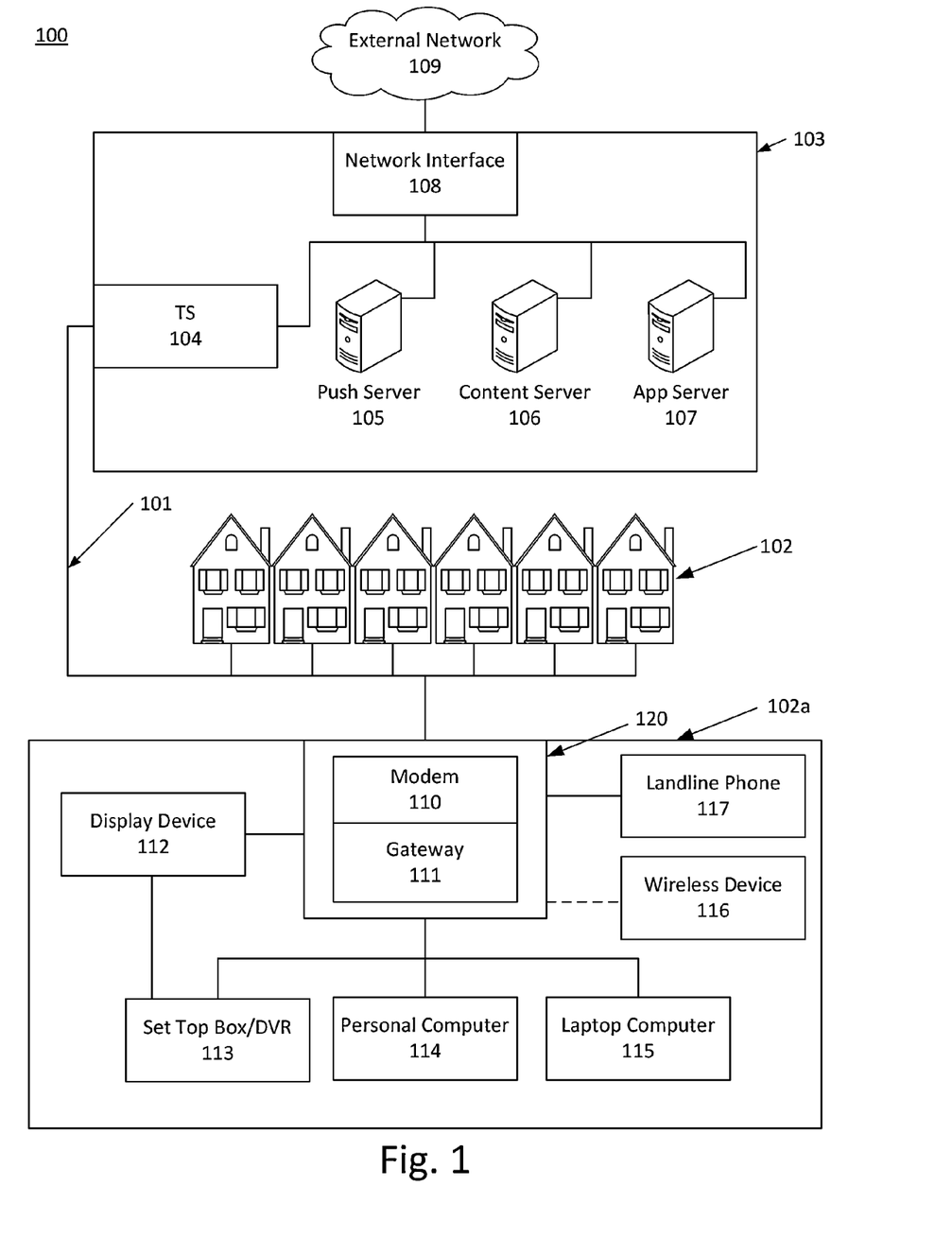
FIG. 1 illustrates an example communication network on which various features described herein may be used.

FIG. 1 illustrates an example communication network 100 on which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, user dwellings, etc.) to a local office or headend 103. The local office 103 may transmit downstream information signals onto the links 101, and one or more premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths. By running fiber optic cable along some portions, for example, signal degradation may be significantly minimized, allowing a single local office 103 to reach even farther with its network of links 101 than before.

The local office 103 may include an interface, such as a termination system (TS) 104. More specifically, the interface 104 may be a cable modem termination system (CMTS), which may be a computing device configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user(s) and/or device(s).

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data.

An example premises 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway 111 may be a set-top box (STB), digital video recorder (DVR), computer server, or any other desired computing device. The gateway 111 may also include (not shown) local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Figure 2:
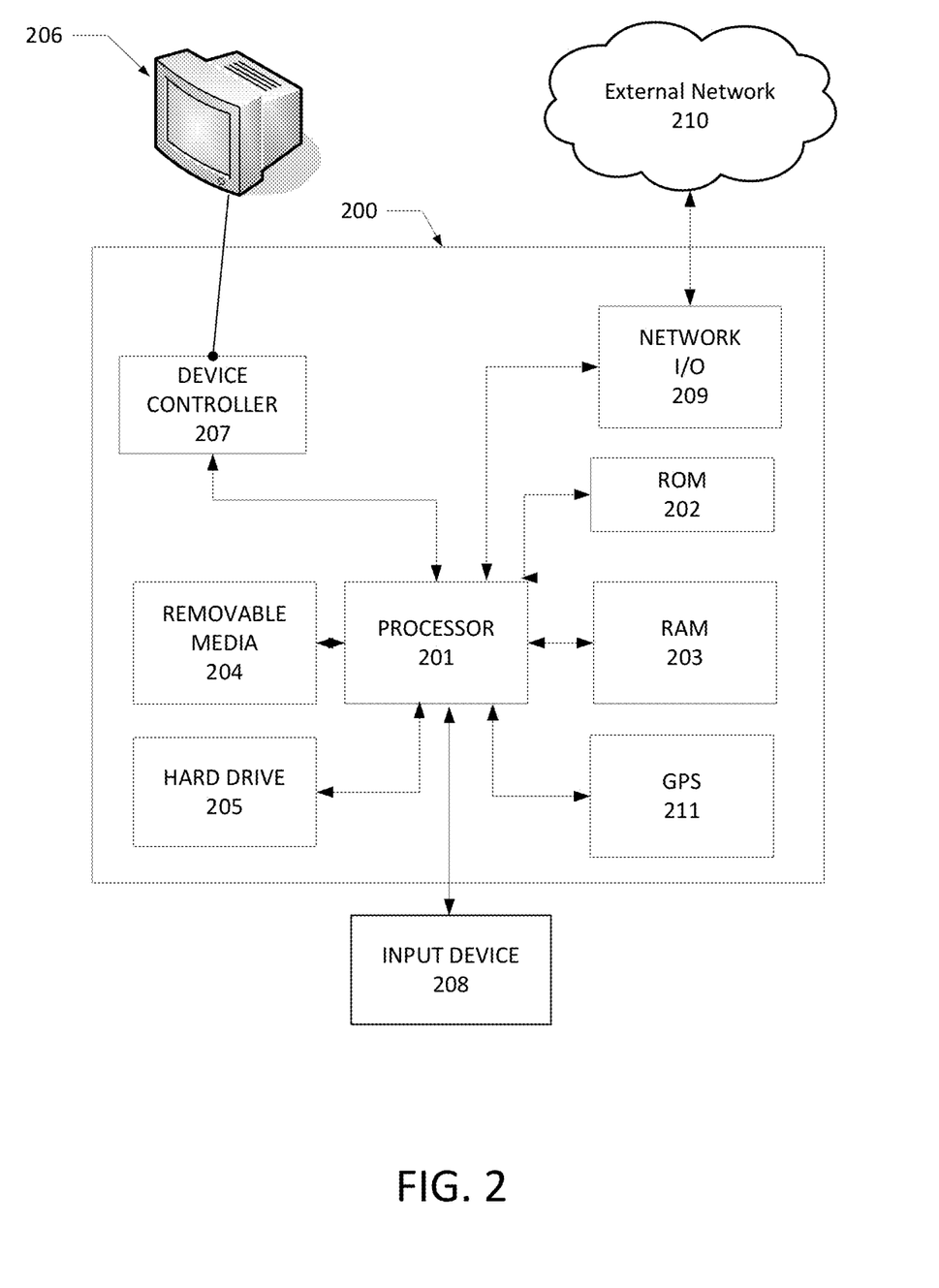
FIG. 2 illustrates an example computing device that can be used to implement any of the methods, servers, entities, and computing devices described herein.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device.

The FIG. 2 example is a hardware configuration, although the illustrated components may be implemented as software as well. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 3:
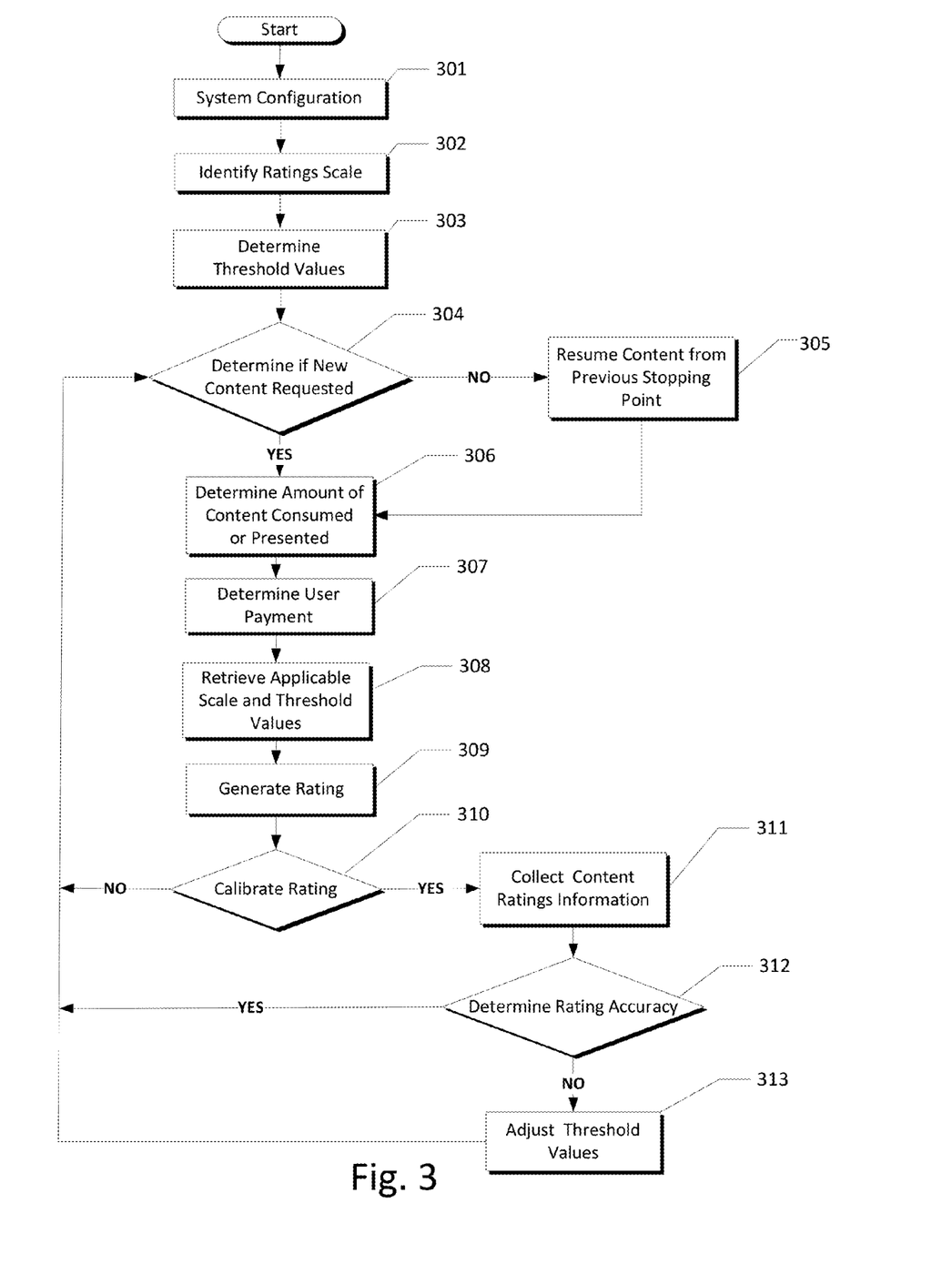
FIG. 3 illustrates an example method of rating a content item according to one or more illustrative aspects of the disclosure.

FIG. 3 is a diagram illustrating an example method of rating a content item according to one or more illustrative aspects of the disclosure. The results of the rating may be implemented on their own to recommend content or may be combined with other recommendation systems. The steps illustrated in FIG. 3 may be performed, for example, by one or more computing devices at the local office 103, such as content server 106. The steps may also be implemented by a distributed computing system, having devices at various locations. One or more computing devices may be implemented as a computing device using the structure shown in FIG. 2, and may be configured to respond to user requests for content, such as streaming video or audio. For example, the computing devices may provide video on demand services, and may deliver streaming media, such as movies, television shows, radio programs and Internet videos and/or audio, to a user's consumption or access device (e.g., display device 112, gateway 111, personal computer 114, wireless device 116, etc.), or any other desired computing device. For brevity, the following description will generally assume that the steps illustrated in FIG. 3 are performed by a computing device, which may include one or more provider or third-party computing devices, which may be disposed at local office 103 or other locations.

In step 301, the computing device (e.g., one or more computing devices) may be configured to perform various system configuration steps. This configuration process may include registering a user's consumption or access device with a content provider. For example, this registration step may include receiving information (e.g., a username, password, device ID, etc.) for setting up a user account with a content provider. When setting up a user account, a user may specify user and/or device preferences that may determine, at least partially, which content items are subsequently provided to the user. Alternatively, a user may have the option to provide ratings for a plurality of available content items. One or more consumption or access devices associated with a user may be configured to permit the user to assign ratings to one or more content items. The one or more consumption or access devices associated with the user may also be configured to transmit user ratings to the content provider.

The registration process may also include associating one or more consumption or access devices with a particular user. For example, one or more computing devices at local office 103 may associate device identifiers (e.g., MAC identifiers, IP addresses, and the like) to one or more household or user identifiers. One or more homes may have a unique household identifier. By associating devices with households, the computing device may track content consumption by each household rather than by individual devices within or associated with the household or a particular user. Alternatively, by associating devices with a user identifier or a user account, the computing device may track content consumption for a plurality of users residing in the same household. Accordingly, the computing device may be configured to generate separate content ratings for multiple users within the same household and/or account.

In some embodiments, one or more consumption or access devices may be assigned to a household. For example, a service provider may collect MAC identifiers from various consumption or access devices at a home 102a when one or more consumption or access devices register with a network operated, owned, or managed by the service provider. The service provider may similarly collect IP addresses from consumption or access devices at the home 102a (either at the time of registration or at any other time). Alternatively (or additionally), one or more homes may be assigned a particular set of IP addresses, such as a range of IP addresses (e.g., 123.123.123.001 to 123.123.123.255), a list of specific IP addresses (e.g., 123.123.123.001, 144.123.123.155, and 123.123.123.123), or a combination thereof. The set of MAC identifiers and IP addresses associated with one or more homes may be determined and/or updated at any time. Similarly, if a user logs into his or her user account from an out-of-household location, the user's credentials may be used to identify the user or the user's home 102.

Once a user account is set up, one or more consumption or access devices associated with a user may be configured to receive content items from the content provider so that the remaining steps of FIG. 3 may be performed. In one embodiment, content items may be transmitted to one or more users via an electronic medium. Content items may be provided by any of a variety of transmission methods, e.g., over an electronic media/network, to one or more user consumption or access devices. For example, content items may be provided by content server 106. The content items may be received by and/or presented on a variety of different types of user devices, such as televisions, set-top boxes, personal computers (e.g., desktop, laptop, and tablet computers, etc.), and mobile devices (e.g., mobile phones, tablet computers, etc.), using various different transmission networks and electronic media (e.g., cable, Internet, wireless, etc.).

For example, one or more content items provided by a content provider may include a television program, a movie, or an audio recording transmitted by server 106 at a local or central office 103, over a cable network 101 (e.g., coaxial cables, optical fibers, wireless links, or any combination thereof, etc.). In other examples, the content items may be an Internet (or any packet-switched network) video clip transmitted by a web server to a computing device associated with a user and presented by a browser application during a web browsing session. Other content items may be retrieved and presented to users by software applications executing at gateways and televisions, PCs, mobile devices, or other electronic devices. For instance, mobile applications executing on mobile phones and other devices may be programmed to present content items to users upon the user's request.

In step 302, the computing device (e.g., one or more computing devices) may be configured to identify a rating scale for one or more content items available to a user. In one embodiment, the computing device may be configured to generate ratings that complement a rating and/or recommendation system offered by a content provider. For example, if a user consumes content items from a content provider, such as a video streaming service, the computing device may be configured to identify the content provider and one or more content rating scales utilized by the content provider to rate or recommend content items. In one embodiment, the computing device may communicate with one or more computing devices associated with a content provider to identify a content rating scale. In another embodiment, the computing device may send a request to one or more computing devices associated with a content provider for information relating to a content rating scale. In other embodiments, the computing device may be configured to store in memory information relating to an identified content rating scale for one or more content items. In some embodiments, the computing device may be configured to transmit to an interface, such as gateway 111, information relating to an identified content rating scale. In other embodiments, gateway 111 may be configured to store in memory information relating to an identified content rating scale.

After one or more rating scales are identified, the computing device may be configured to process information relating to a content provider's rating scale and/or recommendation system to identify a plurality of rating levels of the rating scale. Rating levels may be utilized by the computing device to determine a rating for one or more content items. In another embodiment, where the content provider may not support or provide a rating scale, the computing device may be configured to identify a rating scale to rate one or more available content items. In other embodiments, the computing device may be configured to generate ratings that may serve as an input into a content rating and/or recommendation system. In another aspect of the disclosure, a content rating and/or recommendation system may utilize various rating scales to rate content items. For example, the rating system identified by the computing device may comprise a system that rates content items on one or more numerical scales (e.g., 1 to 5; 1-10; 1-100, etc.). In another example, the identified rating system may rate content items based on a set of pre-determined descriptions (e.g., "poor," "good," "great," "excellent," etc.).

In another embodiment, the computing device may be configured to update the content rating of one or more content items. For example, if the user consumes a content item that has previously been rated by the user, the computing device may be configured to update the initial user rating for the content item in accordance with the steps described herein. In another example, the computing device may be configured to process data relating to an initial user rating for the content item when generating a rating in accordance with the steps described herein. In still another example, if the user consumes a content item that has previously been rated by the user, the computing device may be configured to store in memory the initial rating for the content item. In some embodiments, the computing device may be configured to store in memory one or more ratings generated by the computing device for any content item consumed by the user. In other embodiments, the computing device may be configured to store in memory user ratings for one or more content items. In another embodiment, the computing device may be configured to transmit to a recommendation system and/or a recommendation service information relating to a content rating for one or more content items.

In some embodiments, where the computing device has previously generated a rating for a content item and the user assigns a rating for that content item, the computing device may be configured to replace the generated rating with the assigned user rating. In yet another embodiment, the computing device may be configured to transmit information relating to one or more generated ratings to one or more consumption or access devices associated with the user. For example, the user may transmit a request to the computing device, from one or more consumption or access devices, for the presentation of a rating for a content item. In still another embodiment, the computing device may be configured to receive a request from a user to assign a generated rating as the user's own rating for that content item.

In step 303, the computing device (e.g., one or more computing devices) may be configured to determine threshold values for one or more identified rating levels. In some embodiments, threshold values for a rating level may be associated with the amount of a content item that the user consumes. In another aspect of the disclosure, the computing device may be configured to process data relating to one or more characteristics of a content item to determine the threshold values for a rating level. For example, the computing device may be configured to process data relating to the number of times a user consumes a content item to determine the amount consumed threshold values for a rating level. An amount consumed threshold value may also be described herein as an amount presented threshold value.

In another example, the computing device may be configured to process data relating to cost of a content item to determine the threshold values for a rating level. In yet another example, the computing device may be configured to process data relating to the amount the user paid for a content item to determine the threshold values for a rating level. For example, the computing device may be configured to determine the threshold values for a rating level based data relating to whether the user has paid for a content item, and the amount the user has paid for that content item. Alternatively, the computer device may be configured to determine the threshold values for a rating level based on data relating to whether the user has exchanged something of value (e.g., a coupon, reward, etc.) as payment for a content item, and the value (monetary or otherwise) of the exchanged item. In still another example, the computing device may be configured to process data relating to quality of a content item (e.g., standard definition, high-definition, 3-D content, etc.) to determine the threshold values for a rating level. In another example, the computing device may be configured to process data relating to a content item type (e.g., movie, television program, sporting event, etc.) to determine the threshold values for a rating level.

In yet another example, the computing device may be configured to process data relating to genre of a content item (e.g., drama, adventure, mystery, comedy, action, etc.) to determine the threshold values for a rating level. Additionally, the computing device may be configured to process data relating to one or more combinations of characteristics relating to a content item when determining the threshold values for a rating level associated with the content item. In other embodiments, the computing device may be configured to store in memory information relating to the threshold values for an identified rating scale. In some embodiments, the computing device may be configured to process one or more threshold values (e.g., amount consumed threshold values) when determining a rating for a content item.

In some embodiments, the computing device may be configured to identify one or more portions of a content item based on one or more characteristics of the content item. For example, where the content item type is a sporting event, the computing device may be configured to identify one or more portions (e.g., quarter, half, round, etc.) of the sporting event. In other embodiments, the computing device may be configured to assign a weight to one or more portions of a content item based on one or more characteristics of the content item. For example, where the content item genre is a mystery the ending of the content item may be the most appealing portion of the content item for the user to consume, and as such, the computing device may be configured to assign a higher weight to a final portion of the content item.

Table 1 below shows the exemplary amount consumed threshold values associated with three content items within a 4-star rating scale. The amount consumed threshold values shown in Table 1 were determined based on content item cost and type.

TABLE 1

| | | | | Rating Scale | | | |
| --- | --- | --- | --- | --- | --- | --- | --- |
| | | Cost | Content Type | 1-Star | 2-Stars | 3-Stars | 4-Stars |
| Amount Consumed or Presented | Ex. A | $0 | Audio Recording | 0-25% | 26-50% | 51-75% | 76%+ |
| | Ex. B | $0 | TV Show | 0-20% | 21-40% | 41-65% | 66%+ |
| | Ex. C | $0 | Movie | 0-15% | 16-35% | 36-60% | 61%+ |

As shown in Table 1, one or more rating levels on the 4-star rating scale are assigned a plurality of amount consumed threshold values based on content item cost and type. These amount consumed threshold values may be processed by the computing device to determine a rating for one or more content items. Table 1 illustrates that in Example A, a computing device may determine that when 0-25% of content, e.g., an audio recording (e.g., song, mp3 file, etc.) or video content has been consumed by the user, the item of content will be awarded a rating of 1-star; when 26-50% of the content recording has been consumed by the user, the item of content will be awarded a rating of 2-stars; when 51-75% of the content recording has been consumed by the user, the item of content will be awarded a rating of 3-stars, and when at least 76% or more of the content has been consumed by the user, the item of content will be awarded a rating of 4-stars. As illustrated by Table 1, a user may consume a lesser amount of a television show (e.g., 66%) to generate a 4-star rating compared to the amount of the audio recording that may be consumed. Similarly, a user may consume a lesser amount of a movie (e.g., 61%) to generate a 4-star rating compared to the amount of the television show or audio recording that may be consumed to generate a 4-star rating.

When determining the amount consumed threshold values for a rating level, the computing device may be configured to process a plurality of data inputs relating to one or more content items available to the user. In one embodiment, the computing device may be configured to identify and/or process information relating to the duration of a content item to determine the relative amount consumed threshold values. For instance, in Example C of Table 1, the computing device may be configured to determine that a particular type of content item (e.g., a movie), will generally be longer in duration than other types of content items (e.g., a television show or audio recording). Accordingly, the computing device may be configured to establish lower amount consumed threshold values for awarding a 1-star rating to a movie, and may be configured to establish higher amount consumed threshold values for awarding a 1-star rating to an audio recording, in view of the relative duration these particular types of content items. A variety of information and data inputs relating to available content items may be processed by the computing device to determine the amount consumed threshold values for said content items.

In some embodiments, the amount consumed threshold values established by the computing device for an identified rating scale may be updated in accordance with information collected by the computing device when the content item is consumed on multiple occasions by the user. For example, the computing device may process data relating to the number of times a user has consumed a particular content item to update a rating for that content item. In another example, the computing device may process data relating to the number of times a user has consumed a particular content item to update the amount consumed threshold values associated with that content item. This feature will be described in greater detail further below.

Table 2 below shows the exemplary threshold values associated with three content items within a 5-star rating scale. The threshold values shown in Table 2 were determined based on content item cost and type.

TABLE 2

| | | | | Rating Scale | | | | |
| --- | --- | --- | --- | --- | --- | --- | --- | --- |
| | | Cost | Content Type | 1-Star | 2-Stars | 3-Stars | 4-Stars | 5-Stars |
| Amount Consumed or Presented | Ex. A | $10 | TV Show | 0-5% | 6-25% | 26-50% | 51-75% | 76%+ |
| | Ex. B | $5 | TV Show | 0-15% | 16-35% | 36-55% | 56-80% | 81%+ |
| | Ex. C | $0 | TV Show | 0-20% | 21-40% | 41-70% | 71-90% | 91%+ |

Table 2 illustrates that in Example A, where the content item is available for purchase at $10, a computing device may determine that when more than 76% of the content (e.g., the television show) has been consumed by the user, the content item will be awarded a rating of 5-stars. In Example B, where the content item is available for purchase at $5, the computing device may determine that when more than 81% of the content has been consumed by the user, the content item will be awarded a rating of 5-stars. Lastly, in Example C, where the content item is free (e.g., purchased for $0), the computing device may determine that when at least 91% or more of the content has been consumed by the user, the content item will be awarded a rating of 5-stars. As illustrated in Table 2, cost of the content item may be processed by the computing device to establish the amount consumed threshold values for one or more content items.

The various costs attributed to one or more content items and/or the amount paid for one or more content items by a user may affect the threshold values established by the computing device. As illustrated in Table 2, a user may consume a larger amount of the free TV show to generate a 5-star rating (e.g., 91%) than would be consumed to generate a 5-star rating for the $5 TV Show (e.g., 81%), or the $10 TV show (e.g., 76%). In some embodiments, the computing device may be configured to process data relating to an amount paid by the user for one or more content items to determine the threshold values for said content items. For example, a user may consume a larger amount of a free content item to generate a 5-star rating than would be consumed to generate a 5-star rating for an item of content that was purchased or exchanged for an item of value (e.g., a coupon, reward, etc.). A variety of information and data inputs relating to the one or more content items available for consumption, such as a user's consumption history, may be processed by the computing device to determine the amount consumed threshold values for content items.

In another embodiment, the computing device may be configured to establish the threshold values for the identified rating scale based on one or more combinations of data inputs relating to a content item. Table 3 below shows the exemplary threshold values associated with three content items within a 5-star rating scale. The threshold values shown in Table 3 were determined based on content item cost, content item type, the number of times the user previously has consumed the content item, and whether or not a user pays or exchanges something of value for the content. The following content items are represented in the Table below: (A) a free television program that the user has previously watched once; (B) a movie that the user has never previously consumed and is available for purchase at $5; and (C) a pay-per-view boxing match that the user has never previously consumed and is available for purchase for $50.

TABLE 3

| | | Cost | # of Prev. Consumptions | User Payment | Content Type | Rating Scale | | | | |
|---|---|---|---|---|---|---|---|---|---|---|
| | | | | | | 1-Star | 2-Stars | 3-Stars | 4-Stars | 5-Stars |
| Amount Consumed or Presented | Ex. A | $0 | 1 | Yes | TV Show | 0-20% | 21-40% | 41-60% | 61-80% | 80%+ |
| | Ex. B | $5 | 0 | Yes | Movie | 0-15% | 16-25% | 26-50% | 51-75% | 76%+ |
| | Ex. C | $50 | 0 | Yes | PPV - Boxing | 0-3% | 4-10% | 11-35% | 36-50% | 51%+ |

Table 3 illustrates that in Example A, when the content item (e.g., the television program) can be purchased for free, the computing device may determine that the user may consume 0-20% of the content (e.g., the movie) to generate a rating of 1-star. However, when a user has purchased and/or exchanged an item of value as payment for the $5 movie, the computing device may determine that the user may consume 0-15% of the $5 movie, a lower threshold than that attributed to the free television program, to generate a rating of 1-star. As illustrated on Table 3, a user may consume 0-3% of the pay-per-view boxing match, a lower threshold than that attributed to the free television show or the $5 movie, to generate a rating of 1-star for the pay-per-view boxing match.

Table 4 below shows the exemplary threshold values associated with three content items within a 5-star rating scale. The threshold values shown in Table 4 were determined based on content item cost, type and genre.

TABLE 4

| | | Cost | Genre | Content Type | Rating Scale | | | | |
|---|---|---|---|---|---|---|---|---|---|
| | | | | | 1-Star | 2-Stars | 3-Stars | 4-Stars | 5-Stars |
| Amount Consumed or Presented | Ex. A | $5 | Comedy | Movie | 0-10% | 11-30% | 31-50% | 51-75% | 76%+ |
| | Ex. B | $5 | Action | Movie | 0-15% | 16-35% | 36-55% | 56-80% | 81%+ |
| | Ex. C | $5 | Mystery | Movie | 0-20% | 21-40% | 41-70% | 71-90% | 91%+ |

Table 4 illustrates that in Example A, where the content item is a $5 comedy movie, the computing device may determine that when at least 76% or more of the content has been consumed by the user, the content item will be awarded a rating of 5-stars. In example B, where the content item is a $5 action movie, the computing device may determine that when at least 81% or more of the content has been consumed by the user, the content item will be awarded a rating of 5-stars. Lastly, in Example C, where the content item is a $5 mystery movie, the computing device may determine that when at least 91% or more of the content item has been consumed by the user, the content item will be awarded a rating of 5-stars.

As illustrated in Table 4, the genre of a content item may affect the threshold values established by the computing device. For example, a user may consume a larger amount of content (e.g., at least 91% or more) to generate a 5-star rating for a content item, e.g., a mystery movie, than would need to be consumed to generate a 5-star rating for another type of content item, such as an action movie, which requires at least 81% or more of the content to be consumed; or a comedy movie, which requires at least 76% or more of the content to be consumed. In another example, where the computing device may be configured to assign a weight to one or more portions of a content item, a user may consume a larger amount of a content item, e.g., a mystery movie, than a similarly priced content item of a different genre to receive a 5-star rating given that a final portion of the mystery movie may be assigned a higher weight than the final portions of other content types, such as action movies or comedy movies.

As described above, the computing device may process one or more data inputs relating to a content item, including, but not limited to, the number of times a user has previously consumed the content item, content item cost, and content item type, to determine the threshold values for an identified rating level. For instance, in Example C, the computing device may have determined that for a pay-per-view event, like a boxing match, the user would not be expected to consume the entire content item because the user may only want to watch the main event or an undercard match. Alternatively, the computing device may have determined that given the extended duration of a pay-per-view event, like a boxing match that includes multiple matches, the user would not be expected to consume the entire content item.

In one embodiment the computing device may be configured to receive a request for a content item from one or more consumption or access devices associated with a user. In another embodiment, one or more consumption or access devices may be configured to transmit a request for a content item to the computing device. In another embodiment, one or more consumptions or access devices may be configured to transmit a request for a content item to one or more content provider or third-party servers, such as content server 106. In yet another embodiment, the computing device may be configured to receive a request for a content item from gateway 111. Various types of content items may be made available for consumption by a content provider. For example, the computing device may be configured to request various forms of content, including, but not limited to, video, audio, web pages, etc.

In step 304, the computing device (e.g., one or more computing devices) may be configured to determine whether a requested content item has been previously consumed by a user. For example, if a user is consuming a requested content item for the first time (e.g., the content item has not been previously consumed by the user), the computing device may be configured to begin tracking the user's consumption of the content item. In another embodiment, the computing device may determine whether a user has previously consumed a content item in its entirety. For example, the computing device may be configured to identify and record in memory the number of times a user has previously consumed a requested content item.

In step 305, the computing device (e.g., one or more computing devices) may be configured to resume the presentation or display of a content item from a previous stopping point. In some embodiments, the computing device may be configured to identify the previous stopping point for a requested content item. In another embodiment, where a user begins consuming a content item on a consumption or access device associated with the user and subsequently chooses to pause consumption of the content item, the consumption or access device may be configured to record the user's stopping point. For example, a user may begin consuming a content item on a consumption or access device, pause consumption of the content item, and resume consuming the content item on the same or different consumption or access device from the previous stopping point of the content item. In some embodiments, a consumption or access device associated with a user may be configured to transmit to the computing device information relating to a consumption stopping point for a requested content item. In other embodiments, a consumption or access device may be configured to transmit to an interface, such as gateway 111, information relating to a consumption stopping point for a requested content item. In one embodiment, the computing device may be configured to request from the content provider information relating to a consumption stopping point for a content item consumed by a user.

In some embodiments, the computing device may be configured to identify when a user has resumed consumption of a content item. In one example, the computing device may be configured to communicate with one or more computing devices associated with a content provider to determine whether a user is resuming consumption of a requested content item. In other embodiments, the computing device may be configured to identify the one or more consumption or access devices used by a user to consume a content item. In another embodiment, one or more consumption or access devices may be configured to transmit to the computing device information relating to one or more consumption starting and/or stopping points for a requested content item. In still another embodiment, the computing device may be configured to request information relating to one or more consumption starting and/or stopping points from one or more consumption or access devices associated with a user. In yet another embodiment, one or more consumption or access device may be configured to transmit to an interface, such as gateway 111, information relating to one or more starting and/or stopping points for a requested content item. In one embodiment, gateway 111 may be configured to transmit to the computing device information relating to one or more consumption starting and/or stopping points for a requested content item.

In some embodiments where the user is resuming consumption of a requested content item, the computing device may be configured to request information identifying a total time value corresponding to the amount of the content item previously consumed by a user over a plurality of consumption sessions. For example, if a user watches 10% of a content item on day one, resumes consumption of the content item on day two and watches an additional 10% of the content item, on a subsequent consumption session the computing device may be configured to determine that the user is resuming consumption of the content item and has previously consumed 20% of that content item over a span of two previous consumption sessions. In another example, the computing device may be configured to identify one or more non-contiguous portions of the content item's duration that were consumed by a user over a certain period time. Alternatively, if the user decides to resume consumption of a content item from the beginning of the content item, the computing device may be configured to clear from memory the amount of the content item previously consumed by the user, prior to beginning to monitor consumption of the requested content item.

In step 306, the computing device (e.g., one or more computing devices) may be configured to determine the amount of the requested content item consumed by the user. In one embodiment, one or more consumption or access devices may monitor a user's content consumption and store in memory information relating to the amount of a requested content item consumed by the user. In some embodiments, the computing device will monitor the amount of the content item consumed by a user until the user stops consumption and/or the content item has been totally consumed. In other embodiments, the computing device may be configured to store in memory information identifying a total time value of the content item consumed by a user over one or more consumption sessions.

In some embodiments, the computing device may be configured to store in memory information identifying a percentage of a duration of the content item consumed by a user. In some embodiments, the computing device may be configured to store in memory information identifying one or more non-contiguous portions of the content item's duration that were consumed by a user. For example, the computing device may be configured to exclude from this identification process any portions of the consumed content item that were skipped by the user. This content consumption information may be transmitted to an interface, such as gateway 111, for further processing. In other embodiments, one or more content consumption or access device may be configured to store in memory information identifying a percentage of a duration of the content item consumed by a user. Alternatively, content consumption information stored by one or more consumption or access devices may be transmitted to the computing device. In another embodiment, gateway 111 may be configured to monitor the user's consumption history and store in memory information relating to the amount of content consumed by the user on one or more consumption or access devices.

In other embodiments, the computing device may be configured to request information relating to a user's consumption history and/or the amount of a content item that has been consumed by the user on one or more consumption or access devices. In one embodiment, the amount of content consumed by the user may be monitored and/or recorded by one or more computing devices associated with a content provider. For example, if a user uses one or more consumption or access devices to select a content item for consumption from a content provider, such as Netflix, the content provider may monitor the consumption history of the user and/or store information relating to the amount of a content item consumed by the user. In some embodiments, one or more computing devices associated with the content provider may be configured to transmit to the computing device information relating to the amount of the content item consumed by a user. In other embodiments, the consumption or access devices associated with a user may be configured to transmit, to one or more computing devices associated with the content provider, information relating to the amount of the content item consumed by the user.

In another embodiment, the computing device may be configured to communicate with one or more computing devices associated with the content provider to transmit a request for information relating to the amount of the content item consumed by the user. In other embodiments, the computing device may be configured to communicate with the content provider to receive information relating to the amount of the content item consumed by a user. In some embodiments where the user has chosen to resume consumption of a content item, the computing device may be configured to request information relating to a user's consumption history and/or information relating to the amount of the content item consumed by the user. In some embodiments, the computing device may be configured to monitor the amount of the content item consumed by the user until consumption is stopped.

In step 307, the computing device (e.g., one or more computing devices) may be configured to determine whether a user has paid and/or exchanged something of value for one or more content items requested by the user. In some embodiments, step 307 may be performed subsequent to, or alternatively, in place of step 306. In one embodiment, the computing device may be configured to identify one or more types of user payment. For example, the computing device may be configured to determine whether the user has credited the cost of one or more content items to a user account. In another example, the computing device may be configured to determine whether the user has exchanged something of value (e.g., a coupon, gift certificate, etc.) for one or more requested content items. In another embodiment, the computing device may be configured to identify an amount paid by the user for one or more content items requested by the user. For example, the computing device may be configured to identify a value (monetary or otherwise) associated with a user payment for one or more requested content items. As another example the computing device may be configured to identify the value of an item (e.g., a coupon, gift certificate, etc.) exchanged as payment for one or more requested content items. In some embodiments, the computing device may be configured to determine whether the user has submitted one or more types of user payment for one or more of requested content items. For example, a user may pay for a portion of a content item by exchanging something of value (e.g., redeeming a coupon), and pay for the remaining portion of said content item by crediting their user account for the outstanding balance. In other embodiments, the computing device may be configured to determine a total value (monetary or otherwise) associated with one or more types of user payment.

In another embodiment, one or more consumption or access devices may determine whether a user has paid for one or more requested content items. In other embodiments, one or more consumption or access devices may store in memory information relating to an amount paid for one or more content items by the user. This payment information may be transmitted to an interface, such as gateway 111, for further processing. Alternatively, user payment information stored by one or more consumption or access devices may be transmitted to the computing device. In some embodiments, the computing device may be configured to store in memory information identifying an amount paid for one or more content items by the user. In another embodiment, the computing device may be configured to store in memory information identifying a value (monetary or otherwise) assigned to an amount paid by the user payment for one or more content items. In other embodiments, the computing device may be configured to request information relating to a user's payment history and/or an amount paid for one or more content items requested by a user.

In some embodiments, one or more computing devices associated with the content provider may be configured to transmit to the computing device information relating to an amount paid for one or more content items requested by a user. In other embodiments, the consumption or access devices associated with a user may be configured to transmit, to one or more computing devices associated with the content provider, information relating to an amount paid for one or more content items requested by a user. In another embodiment, the computing device may be configured to communicate with one or more computing devices associated with the content provider to transmit a request for information relating to an amount paid for one or more content items requested by a user. In other embodiments, the computing device may be configured to communicate with the content provider to receive information relating to an amount paid for one or more content items requested by a user. In some embodiments where the user has chosen to resume consumption of a content item, the computing device may be configured to request information relating to a user's payment history and/or information relating to the amount paid for the content item selected by the user.

In step 308, the computing device (e.g., one or more computing devices) may be configured to retrieve applicable rating scales, rating levels, and the threshold values associated with one or more requested content items. In one embodiment, the computing device may be configured to retrieve from memory information relating to the applicable rating scales, rating levels, and the threshold values associated with one or more requested content items.

In some embodiments, the computing device may be configured to request from the content provider a plurality of rating levels for a rating scale associated with the one or more requested content items. In one embodiment, the computing device may be configured to request from a content provider's recommendation system a plurality of rating levels for a rating scale associated with the one or more requested content items. In other embodiments, the computing device may be configured to transmit to an interface, such as gateway 111, an identification of one or more rating levels for a rating scale associated with the one or more requested content items. For example, the computing device may identify the applicable rating levels and the amount consumed threshold values for the one or more content items requested by a user, and transmit this information to an interface, such as gateway 111, for further processing.

In another embodiment, the computing device may be configured to receive information from gateway 111 relating to one or more rating levels for a rating scale associated with the one or more requested content items. For example, gateway 111 may be configured to identify applicable rating levels and the amount presented threshold values for the one or more content items requested by the user. In another example, gateway 111 may be configured to transmit rating levels and the amount presented threshold values information to the computing device for further processing. In some embodiments, the computing device may be configured to retrieve from memory information relating to a plurality of rating levels and the amount presented threshold values associated one or more requested content items.

In step 309, the computing device (e.g., one or more computing devices) may be configured to generate a rating for one or more content items requested by the user. In one example, the computing device may be configured to request from information relating to the cumulative amount of the content item consumed by the user. The computing device may be configured to process this consumption information, in addition to the identified rating level and the threshold values associated with the requested content item, to determine a rating for the content item. In one embodiment, the computing device may be configured to identify a rating for a requested content item by comparing the cumulative amount of the requested content item consumed by the user with the rating level and the corresponding amount consumed threshold values associated with the requested content item.

For example, referring to Table 1, if the computing device were to determine that the user consumed 44% of a requested content item, the computing device may compare this information to the amount consumed threshold values associated with the requested content item to determine an appropriate rating. Additionally, if the user requests an audio recording for consumption, the computing device will award a 2-star rating for the audio recording given that the cumulative amount of the content item consumed by the user (e.g., 44%) falls within the amount consumed threshold values for a 2-star rating (e.g., 26-50%). Consequently, in Example A of Table 1, the computing device will generate a 2-star rating for the audio recording in view of the cumulative amount of the content item consumed by the user.

In another example, still referring to Table 1, if the cumulative amount of the content item consumed by the user remains at 44%, but the content item requested by the user is a TV show (not an audio recording), the computing device will award a 3-star rating for the TV show given that the cumulative amount of the content item consumed by the user (e.g., 44%) falls within with the amount consumed threshold values for a 3-star rating (e.g., 41-65%). Accordingly, in Example B of Table 1, the computing device will generate a 3-star rating for the TV show in view of the cumulative amount of the content item consumed by the user.

In one embodiment, the computing device may be configured to transmit to an interface, such as gateway 111, information relating to the rating identified for a requested content item. In one example, the one or more consumption or access devices may be configured to display the identified rating to the user. In other embodiments, the computing device may be configured to transmit to one or more computing devices associated with the content provider information relating to the rating identified for the requested content item. In another embodiment, the computing device may be configured to transmit to a content recommendation system information relating to a rating for a requested content item.

In some embodiments a content recommendation system may be configured to generate a rating for one or more content items requested by a user. In one example, the content recommendation system may be configured to request from the computing device information relating to the cumulative amount of a content item consumed by the user. In another example, the content recommendation system may be configured to request from the computing device information relating to one or more rating levels and the threshold values associated with a content item. In one embodiment the recommendation system may be configured to process this requested information to determine a rating for one or more content items. In other embodiments, the content recommendation system may be configured to process information relating to one or more content ratings to identify a content item for a user to consume.

In step 310, the computing device (e.g., one or more computing devices) may be configured determine whether to calibrate the predictive accuracy of a rating generated for content requested by the user. In some embodiments, the computing device may be configured to receive a request from a consumption or access device to calibrate content item ratings. For example, a software application included on one or more consumption or access devices associated with the user may be configured to permit the user to request a calibration of generated content item ratings. In another embodiment, the computing device may be configured to request the calibration of a content item rating after a predetermined time period since the previous calibration. For example, the computing device may be configured to calibrate content item ratings once a day. In another example, the computing device may be configured to calibrate content item ratings once a week.

In another embodiment, the computing device may be configured to request the calibration of a content item rating after a predetermined number of content items have been requested and/or consumed by the user. For example, the computing device may be configured to calibrate content item ratings after a threshold number of content items have been requested and/or consumed by the user. In another example, the computing device may be configured to calibrate content item ratings for a predetermined number of content items the user requests and/or consumes (e.g., after 20 content items are consumed).

In step 311, the computing device (e.g., one or more computing devices) may be configured to collect information relating to content ratings for one or more content items. In one embodiment, the computing device may be configured to transmit a request to the content provider for data relating to user ratings for one or more content items. In some embodiments, the computing device may be configured to retrieve information stored in memory relating to one or more users' previous consumption habits. In other embodiments, the computing device may be configured to retrieve information stored in memory relating to user ratings for content items previously consumed by the user. In one example, the computing device may be configured to retrieve one or more ratings for any content items previously consumed by one or more users. In another example, the computing device may be configured to retrieve one or more generated ratings for one or more content items.

In step 312, the computing device (e.g., one or more computing devices) may be configured to determine the predictive accuracy of content ratings for one or more content items. In one embodiment, the computing device may be configured to compare the expected rating generated by the computing device for a content item with the actual user-rating for that content item. Various statistical metrics may be calculated by the computing device to determine the predicative accuracy of ratings generated by the computing device in view information relating to actual user-ratings. For example, the computing device may be configured to calculate the difference between the expected rating generated by the computing device and the actual user-rating. The computing device may be configured to compare this calculated difference to an accuracy threshold associated with the predictive accuracy of generated content ratings.

In some embodiments the computing device may be configured to determine one or more statistical metrics associated with the predictive accuracy of one or more content rating. For example, the computing device may be configured to identify the standard deviation of a content rating in reference to a standard rating. In one embodiment, the computing device may be configured to generate a standard rating based on a user's rating history of similar content items. In other embodiments, the computing device may be configured to determine whether the one or more statistical metrics associated with the predictive accuracy of a content rating falls below a predetermined accuracy threshold.

In one embodiment the computing device may be configured to identify a distribution of ratings for one or more content items. For example, the computing device may be configured to retrieve from memory information relating to a plurality of ratings for one or more content items. The computing device may be configured to process this information to identify a distribution for the plurality of ratings. In another embodiment the computing device may be configured to receive a distribution of content ratings from a content recommendation system and/or content recommendation service. In some embodiments the computing device may be configured to request from a content recommendation system and/or content recommendation service information relating to the distribution of content ratings for one or more content items.

In step 313, the computing device (e.g., one or more computing devices) may be configured to adjust threshold values established for a rating scale associated with one or more content items. In some embodiments, the computing device may be configured to adjust the amount consumed threshold values for one or more content items in accordance with information collected during the predicative accuracy analysis conducted in step 312. In other embodiment, the computing device may be configured to adjust the amount consumed threshold values for one or more content items in accordance with information relating to a distribution of one or more content ratings. In some embodiments, the computing device may be configured to update generated ratings for one or more content items in accordance with the adjusted amount consumed threshold values. In other embodiments, the computing device may be configured to transmit updated content ratings for one or more content items to a recommendation system. The recommendation system may be configured to identify one or more content items for a user to consume based on one or more updated content ratings.

Although example embodiments are described above, the various features and steps may be combined, divided, omitted, rearranged, revised and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

We claim:

1. A method comprising:
    identifying, for a content item, an amount of the content item consumed by a user;
    identifying, by a processor, threshold values associated with various consumed amounts of the content item;
    generating a content rating for the content item based on the amount of the content item consumed by the user and the identified threshold values;
    measuring a predictive accuracy of the content rating based, at least in part on, a user rating for at least one of the content item and a different content item;
    determining that the predictive accuracy is below an accuracy threshold; and
    in response to the determining, adjusting one or more of the identified threshold values.

2. The method of claim 1, wherein identifying the amount of the content item consumed comprises storing information identifying a total time value spanning a plurality of consumption sessions by the user.

3. The method of claim 1, wherein identifying the amount of the content item consumed comprises storing information identifying a percentage of a duration of the content item consumed by the user.

4. The method of claim 1, wherein identifying threshold values associated with various consumed amounts of the content item further comprises:
    identifying a plurality of rating levels of a rating scale associated with the content item.

5. The method of claim 4, further comprising identifying threshold values for one or more of the plurality of rating levels based on a cost of the content item.

6. The method of claim 4, further comprising retrieving at least one of a rating scale, a rating level, or a plurality of threshold values for one or more content items.

7. The method of claim 4, further comprising:
    identifying a distribution of content ratings for one or more content items; and
    adjusting one or more threshold values in accordance with the distribution of content ratings.

8. A method comprising:
    registering one or more consumption devices associated with a user;
    identifying, by a processor, a rating scale for one or more content items;
    identifying, by the processor, a plurality of amount consumed threshold values associated with the rating scale for the one or more content items;
    identifying an amount of a first content item consumed by the user; and
    generating or updating a content rating for the first content item based on the amount of the first content item consumed by the user and at least one of: a cost of the content item and an amount paid by the user for the first content item.

9. The method of claim 8, wherein identifying the amount of the first content item consumed comprises storing information identifying a total time value spanning a plurality of consumption sessions by the user.

10. The method of claim 8, further comprising identifying threshold values for a first rating level based on combinations of content item cost and content item quality.

11. The method of claim 8, further comprising identifying threshold values for a first rating level based on a genre of one or more of the content items.

12. The method of claim 11, wherein a final portion of the first content item relating to a first genre is assigned a higher weight than a final portion of a second content item relating to a second genre.

13. The method of claim 8, further comprising identifying threshold values for a first rating level based on a type of one or more of the content items.

14. The method of claim 8, further comprising establishing threshold values for a first rating level based on a consumption history of the user for the first content item.

15. The method of claim 8, further comprising adjusting one or more threshold values in accordance with one or more metrics calculated for the first content item.

16. A method comprising:
identifying, for a content item, an amount paid for the content item by a user;
identifying, by a processor, threshold values in accordance with the amount paid for the content item by the user, wherein the threshold values associate a consumption duration with a content rating scale; and
generating a content rating for the content item based on the amount paid for the content item by the user and the identified threshold values.

17. The method of claim 16, wherein identifying threshold values in accordance with the amount paid for the content item further comprises:
identifying a plurality of rating levels of a rating scale associated with the content item.

18. The method of claim 16, wherein identifying the amount paid for the content item comprises determining a type of payment made by the user.

19. The method of claim 16, wherein identifying the amount paid for the content item comprises storing information identifying a total value associated with one or more types of user payment.

* * * * *